Patented June 27, 1950

2,512,606

UNITED STATES PATENT OFFICE 2,512,606

POLYAMIDES AND METHOD FOR OBTAINING SAME

Elmer K. Bolton and William Kirk, Jr., Wilmington, Del., assignors to E. I. du Pont de Nemours & Company, Wilmington, Del., a corporation of Delaware No Drawing. Application September 12, 1945, Serial No. 615,918

3 Claims. (Cl. 260—78)

This invention relates to polymeric materials and more particularly to synthetic polyamides of nylon type.

The polyamides with which this invention is primarily concerned are of the general type described in United States Patents 2,071,250, 2,071,253 and 2,130,948. The polyamides of this kind, generally speaking, comprise the reaction product of linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have an intrinsic viscosity of at least 0.4 and a unit length of at least 7, where "unit length" is defined as in United States Patents 2,071,253 and 2,130,948. The average number of carbon atoms separating the amide groups in these polyamides is at least two.

These linear polyamides include also polymers, as for instance, the polyester-amides, obtained by admixture of other linear polymer-forming reactants, as for instance, glycol-dibasic acid mixtures or hydroxy acids, with the mentioned polyamide-forming reactants. Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

The polyamides described above are useful in many ways, particularly in the form of fibers. However, fibers thereof have relatively low resilience. Furthermore, most of the prior polyamides are not completely clear and transparent when in massive form. For the most part polyamides prepared from a diamine and a dibasic acid alone, such as polyhexamethyleneadipamide or from amino acids alone, such as poly-ε-aminocaproamide, possess a high degree of crystallinity and are opaque, rather sharp melting polyamides. By the preparation of interpolymers, such as polyhexamethyleneadipamide / polyhexamethylenesebacamide (50:50), products are obtainable which are clear and transparent and possess a wider softening range. However, even in most interpolymers special quenching methods or additives are necessary to obtain a completely clear and transparent polyamide, particularly when the polyamide is in a massive form rather than in the more easily quenched form of fine filaments or threads. In addition, most of the prior polyamides are insoluble in common organic solvents and cannot, therefore, be used conveniently for the preparation of solvent-cast films and coatings. Certain alcohol-soluble polyamides have been prepared previously but these are derived from complicated multi-ingredient systems, or by using special and expensive diamines, such as triglycoldiamine.

For a better understanding of the characteristics desired in polyamide filaments, it will be necessary to explain the various terms used herein and the methods of testing employed.

Filament energy resilience

Filament energy resilience is the percentage of work recovered when a deformed filament regains its original form. Thus, the filament may be subjected to bending or stretching and the work recovered by the filament when it regains its original form will give a measurement of resilience. Since resilient fabrics are not obtained from non-resilient filaments, filament resilience and more particularly filament energy resilience values of a filament are significant in indicating the resilience of fabrics had therefrom.

The recovery of a filament from bending is given in terms of its filament flexor value while the recovery of a filament from stretching is measured in terms of work recovery value.

Filament flexor value

After having been conditioned at a given temperature, humidity and pressure, a single filament having denier within the range of from 1 to 20 is bent through a given angle at a radius of curvature of about 1.0 mm. and the work required for this operation is measured. The filament is then allowed to recover under the same conditions and the work done by the filament in unbending is measured. The ratio of the work done by the filament when it recovers to the work required to bend the filament is known as the filament flexor value when reported on a percentage basis. A filament flexor value of 100% would indicate optimum resilience while values of from 65% to 70% (values for cotton filaments) are indicated as of relatively low resilience.

Work recovery after stretching value

After having been conditioned at a given temperature, humidity and pressure, a single filament (having a denier within the range of from 1 to 5) is stretched a given amount within the range of from 0.5% to 2% elongation and the work required for this operation is measured. The filament is then allowed to recover under the same conditions and the work done by the filament in recovering is measured. The ratio of the work done by the filament when it recovers to the work required to stretch the filament is known as the work recovery after stretching value when reported on a percentage basis. A work recovery after stretching value of 100% would indicate optimum resilience.

This invention has as an object new linear polyamides having improved properties. A further object is the provision of polyamides having high resilience. A still further object is the provision of polyamides which are completely clear and transparent when in massive form. Still another object is to provide polyamides which are soluble in chloroform/methanol fixtures. A still further object is the provision of polyamides which have relatively low softening points. Additional objects will become apparent from an examination of the following description and claims.

These and other objects and advantages are obtained according to the hereindescribed invention which comprises condensing a dicarboxylic acid, having at least four carbon atoms between the carboxyl groups, with a dialicyclicdiamine having the general formula

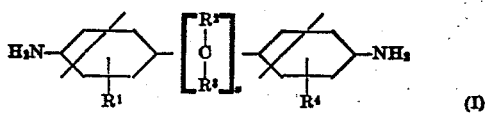

wherein $x$ is a number of the group consisting of zero and positive integers within the range of from 1 to 6 and $R^1$, $R^2$, $R^3$ and $R^4$ are members of the group consisting of hydrogen atoms and methyl radicals.

In a more restricted embodiment this invention comprises condensing a dicarboxylic acid, having not less than four and not more than twelve carbon atoms between the carboxyl groups, with a dialicyclicdiamine having the general formula

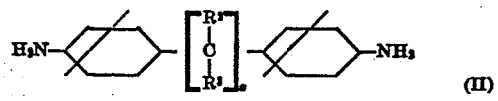

wherein $x$ is a number of the group consisting of zero and positive integers, the total number of carbon atoms in the group

not exceeding three, and $R^2$ and $R^3$ are members of the group consisting of hydrogen atoms and methyl radicals.

A preferred embodiment of this invention comprises condensing sebacic acid with a mixture of stereoisomers of a dialicyclicdiamine having the general formula (II), said mixture being liquid at 25° C.

Various arrangements and selections of equipment for the operation of the process of this invention are possible. In the preferred arrangement, however, a pressure vessel is charged with equimolar amounts of the diamine and the dibasic acid, or with the previously prepared salt of said diamine and said dibasic acid. The reaction mixture is heated under an innert atmosphere to reaction temperature, i. e., 270°–310° C., whereupon condensation is effected and the water formed during the condensation of polymerization is driven off; and heating at a temperature within the range of from 270°–310° C. under atmospheric pressure is continued from one to two hours. There are thus obtained high molecular weight macromolecular linear polyamides having an intrinsic viscosity, as defined in U. S. Patent 2,130,948, of at least 0.4. Further heating of the reaction mixture for from one to three hours at a temperature within the range of from 270°–310° C. under a substantial vacuum, i. e., a pressure of not more than 5 mm. mercury, usually yields polyamides having even higher molecular weight, i. e., polyamides having an intrinsic viscosity of at least 0.9.

The following examples in which the proportions are in parts by weight unless otherwise specified are given for illustrative purposes and are not intended to place any restrictions on the hereindescribed invention.

Example I

Di(p-aminocyclohexyl)methane was prepared by the hydrogenation of 49.5 parts of di(p-aminophenyl)methane in 125 parts of purified dioxane over 2.5 parts of ruthenium dioxide catalyst. The reaction was run at 100° C. and 1500–2200 lbs./sq. in. of hydrogen. After removal of the catalyst and solvent, the product, which was liquid at 25° C., boiled at 141°–143° C./4 mm. The yield was 41.6 parts or 79.2% of the theoretical amount. $n_D^{32.5}=1.5030$.

Anal.: Calc'd. for $C_{13}H_{26}N_2$; Neutral equivalent=105.2. Found; Neutral equivalent=105.0.

The salt from the above di(p-aminocyclohexyl)methane and sebacic acid was prepared by dissolving 21.0 parts of the diamine in 100 parts of absolute ethanol, 20.2 parts of sebacic acid in 100 parts of absolute ethanol and mixing the two solutions. The insoluble salt precipitated on cooling. This salt was charged into a reaction vessel and heated at 255° C. at atmospheric pressure under nitrogen for 0.5 hour, then at 285° C. at atmospheric pressure for 0.5 hour. The reaction was completed by heating at 285° C. under approximately 2 mm. pressure for 1.75 hours. The resulting polyamide was colorless, clear and transparent. It was very tough, had an intrinsic viscosity, as defined in U. S. Patent 2,130,948, of 1.4, softened at 200° C., and was soluble in chloroform/methanol mixtures, e. g. a mixture of equal parts by volume of chloroform and methanol. Filaments thereof had a filament flexor value of 82% and a work recovery after stretching value of 93% at 0.76% elongation. In contrast thereto, filaments of a polyhexamethyleneadipamide, had by reacting hexamethylenediamine with adipic acid under substantially identical conditions, had a filament flexor value at 69% and a work recovery after stretching value of 70% at 0.76% elongation.

Example II

The di(p-aminocyclohexyl) methane used in the preparation of the following polymer was prepared by the hydrogenation of 49.5 parts of di(p-aminophenyl)methane in 125 parts of purified dioxane over 0.35 part of ruthenium dioxide supported on charcoal (0.05% ruthenium dioxide). The reaction was carried out at 200° C. and a top hydrogen pressure of 2700 lbs./sq. in. After 3 hours under these conditions, the catalyst and solvent were removed and the remaining portion distilled. A yield of 37.8 parts or 72% of the theoretical amount was obtained of the product which was liquid at 25° C. and boiled at 112° C./0.3 mm. pressure. $n_D^{29}=1.5025$.

Anal.: Calc'd. for $C_{13}H_{26}N_2$; Neutral equivalent=105.2. Found; Neutral equivalent=105.4.

The salt of this diamine with sebacic acid was prepared in the same manner as that described in Example I. This salt was charged into a reaction vessel and heated at 285° C. and atmospheric pressure under nitrogen for 0.5 hour, and the reaction was completed by further heating at 285° C. and approximately 5 mm. pressure for 3.0 hours. The resulting polyamide was a clear, transparent and tough product softening at 245° C. and having an intrinsic viscosity of 1.38. The polyamide was soluble in chloroform/methanol mixtures, e. g., a mixture of equal parts by volume of chloroform and methanol.

Example III

The diamine subsequently used for the preparation of the following polyamide was prepared by the hydrogenation of 49.5 parts of di(p-aminophenyl)methane in 125 parts of purified dioxane over 0.35 part of ruthenium dioxide supported on charcoal (0.05% ruthenium dioxide). The reaction was carried out at 200° C. and 1500-2200 lbs./sq. in. of hydrogen. The reaction was heated for two hours after the hydrogen absorption had ceased. It should be noted that this additional heating produced a stereoisomeric mixture entirely different from those in Examples I and II as was shown by the decided increase in softening point of the polyamide from this mixture (see below). After removal of the catalyst and solvent, a total of 39.4 parts or 75.1% of the theoretical amount of the product, which was solid at 25° C. and boiled at 100-103° C./1 mm., was obtained. $n_D^{32}=1.5009$.

Anal. Calc'd. for $C_{13}H_{26}N_2$; Neutral equivalent=105.2. Found; Neutral equivalent=106.3.

A salt of this diamine with sebacic acid was prepared in the manner described in Example I. This salt was charged into a pressure vessel and heated for 1.5 hours under pressure. The pressure was released and heating was continued for 0.75 hour at 310° C. and atmospheric pressure under nitrogen. This temperature was not high enough to give a completely homogeneous melt. The temperature was raised to 360° C. and atmospheric pressure under nitrogen for ten minutes and then dropped back to 310° C. and heating continued at this temperature for three hours under approximately 2 mm. of pressure. The product obtained was an opaque, colorless and tough polyamide. It softened at 265° C. and had an intrinsic viscosity of 0.62. It was insoluble in chloroform/methanol mixtures. Filaments thereof have a filament flexor value of 89% and a work recovery after stretching value of 91% at 0.76% elongation.

Example IV

The bi(p-aminocyclohexyl) used in making the following polymer was prepared by the hydrogenation of 46 parts of benzidine in 125 parts of purified dioxane over 2.0 parts of ruthenium dioxide. The reaction was carried out under a pressure of 1500-2200 lbs./sq. in. of hydrogen and at 115°-125° C. The catalyst and solvent were removed and a total of 45.0 parts or 92% of the theoretical amount of bi(p-aminocyclohexyl) was obtained, which was solid at 25° C. and boiled at 108° C./2 mm. pressure.

Anal. Calc'd. for $C_{12}H_{24}N_2$; Neutral equivalent=98.2. Found; Neutral equivalent=99.1.

A salt of this diamine was prepared by dissolving 19.6 parts of the bi(p-aminocyclohexyl) in 80 parts of absolute ethanol, dissolving 20.2 parts of sebacic acid in 80 parts of absolute ethanol and mixing the two solutions. The insoluble salt formed precipitated and was filtered off after cooling. A mixture of eight parts of this salt and 0.078 part of bi(p-aminocyclohexyl) was charged into a pressure vessel, purged with nitrogen and heated in a closed condition at 225° C. for 1.25 hours. The vessel was opened to atmospheric pressure nitrogen and heated at 340° C. and atmospheric pressure under nitrogen for five minutes in order to obtain a completely homogeneous melt. The reaction was completed by heating at 310° C. and 5 mm. pressure for 2.25 hours. The resulting polymer was colorless, opaque, softened at 265° C. and had an intrinsic viscosity of 0.94. It was insoluble in chloroform-methonal mixtures.

Example V

The di(p-aminocyclohexyl)ethane used in preparing the polyamide listed below was made by the hydrogenation of 53 parts of 1,2-di(p-aminophenyl)ethane in 125 parts of purified dioxane over 2.5 parts of ruthenium dioxide. The reaction was carried out at 100° C. and 1500-2200 lbs./sq. in. of hydrogen. After filtering off the catalyst and removing the dioxane solvent, a total of 49.0 parts or 87.5% of the theoretical amount of 1,2-(p-aminocyclohexyl)ethane boiling at 125°-127° C./2.5 mm. was obtained. The product was a colorless, semi-solid, soupy material.

Anal. Calc'd. for $C_{14}H_{28}N_2$; Neutral equivalent=112. Found; Neutral equivalent=111.4.

A salt of this diamine was prepared by dissolving 22.4 parts of the 1,2-(p-aminocyclohexyl)-ethane in 100 parts of absolute ethanol, dissolving 20.2 parts of sebacic acid and 100 parts of ethanol and mixing the solutions. The resulting insoluble salt precipitated from solution on cooling, was filtered and dried in vacuo at room temperature. This salt was charged into a reaction vessel and heated at 285° C. and atmospheric pressure under nitrogen for 0.1 hour. Under these conditions the salt melted but soon solidified as condensation took place. Further heating at 310° C. and atmospheric pressure under nitrogen for 1.75 hours, and at 310° C. and 2 mm. pressure for 1.5 hours was required to finish the polymerization. The resulting polyamide was semi-opaque, colorless and very tough. It was manually spinnable into long fibers which could be cold drawn. It had a softening point of 260° C., an intrinsic viscosity of 1.22 and swelled in chloroform/methanol mixtures, e. g. a mixture of equal volumes of chloroform and methanol, but did not dissolve.

Example VI

The di(p-aminocyclohexyl)methane subsequently used in the preparation of a polyamide with adipic acid was prepared by the hydrogenation of 1250 parts of di(p-aminophenyl)methane, 3125 parts of dioxane and 25 parts of ruthenium dioxide. The reaction required a period of 4.5 hours at 110°–120° C. and a pressure of 1500–2700 lbs./sq. in. of hydrogen. A total of 1147.8 parts or 86.7% of the theoretical amount of di(p-aminocyclohexyl)methane was obtained which was liquid at 25° C. and boiled at 121° C./0.5 mm. to 123° C./0.75 mm. $n_D^{29.5} = 1.5042$.

Anal: Calc'd for $C_{13}H_{26}N_2$; Neutral equivalent= 105.2. Found; Neutral equivalent=105.25.

The adipic acid salt of this diamine was prepared by dissolving 10.5 parts of the di(p-aminocyclohexyl)methane in 50 parts of absolute ethanol, dissolving 7.3 parts of adipic acid in 50 parts of absolute ethanol and mixing the solutions. The resulting insoluble salt precipitated as the solution cooled. It was filtered and dried in vacuo at room temperature. This salt was charged into a reaction vessel, purged with nitrogen and heated at 310° C. and atmospheric pressure under nitrogen for 3.25 hours. The resulting polyamide was clear and transparent and was easily spinnable into long fibers which could be cold drawn.

As hereinbefore stated, the diamines, which can be condensed with a dicarboxylic acid in accordance with this invention, are dialicyclic diamines having the general formula (I). Said dialicyclic diamines are conveniently prepared by heating with hydrogen at a temperature within the range of from 75° C. to 250° C. under a pressure within the range of from 100 lbs./sq. in. in the presence, as catalyst, of ruthenium oxide supported on charcoal, a liquid organic solvent solution of diaryl diamines having the general formula

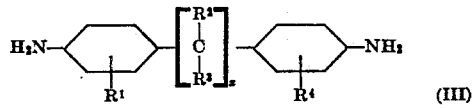

(III)

wherein $x$ is a number of the group consisting of zero and positive integers within the range of from 1 to 6 and $R^1$, $R^2$, $R^3$ and $R^4$ are of the group consisting of hydrogen atoms and methyl radicals. Thus, from a diaryldiamine having the general formula

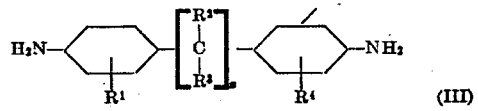

(II)

there is obtained a dialicyclicdiamine having the general formula

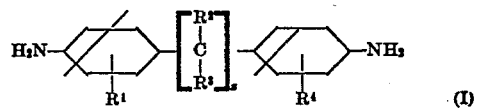

(I)

$x$ in said general formulae being a number of the group consisting of zero and positive integers within the range of from 1 to 6 and $R^1$, $R^2$, $R^3$ and $R^4$ being members of the group consisting of hydrogen atoms and methyl radicals. Included among examples of said diaryldiamines are benzidine, di(p-aminophenyl)methane, 2,2'-dimethyl-4,4'-diaminodiphenylmethane, 2,2-di(p-aminophenyl)propane, 1,2-di(p-aminophenyl)ethane, 1,6-di(p-aminophenyl)hexane, 1,6-di(2-methyl-4 - aminophenyl) 1,1,2,2,3,3,4,4,5,5,6,6 - dodecamethylhexane and the like.

Because of their structural configuration, dialicyclic diamines employed in the process of this invention can exist in three or more stereoisomeric forms. The ratio of these stereoisomers present in any given same of diamine can be controlled to a large extent by proper choice of reaction conditions during its preparation. For example, in the preparation of these dialicyclic diamines by the catalytic hydrogenation of the corresponding diaryl diamine in the presence of ruthenium oxide as catalyst, the production of a product containing a preponderance of lower melting isomers, i. e., of a mixture of isomers which is liquid at 25° C., is favored by the use of low temperatures, e. g., 100° to 125° C., and high catalyst concentration, e. g., 2% to 5% ruthenium oxide by weight. On the other hand, production of a product containing a preponderance of higher melting isomers, i. e., of a mixture of isomers which is solid at 25° C., is favored by the use of relatively higher temperatures, e. g., 150° C. to 220° C. at which temperatures a low catalyst concentration suffices, e. g. 0.01% to 0.1% ruthenium oxide by weight.

When any dicarboxylic acid, having at least four carbon atoms between the carboxyl groups, is condensed in accordance with this invention with any dialicyclic diamine having the general formula (I), or mixture of stereoisomers of said dialicyclic diamine, there is obtained a polyamide which forms filaments having a filament flexor value of not less than 80 and a work recovery after stretching value at 0.76% elongation of not less than 85%, provided the heating, whereby said condensation is effected, is continued until the resultant polymer has an intrinsic viscosity of at least 0.4. Markedly improved results are obtained when said heating is continued until the resultant polymer has an intrinsic viscosity of not less than 0.9.

In addition, polyamides which are completely clear and transparent when in massive form, which are soluble in a mixture of equal volumes of chloroform and methanol and which have relatively low softening points are obtained when a mixture of stereoisomers of a dialicyclic diamine having the general formula (I), said mixture being liquid at 25° C., is condensed in accordance with this invention with a dicarboxylic acid having not less than four and not more than 12 carbon atoms between the carboxyl groups.

Included among examples of dialicyclicdiamines operative in the present invention are: bi(p - aminocyclohexyl), di(p - aminocyclohexyl)methane, 2,2' - dimethyl - 4,4' - diaminodicyclohexylmethane, 2,2 - di(p - aminocyclohexyl)propane, 1,2 - di(p - aminocyclohexyl)ethane, 1,6-di(p-aminocyclohexyl)hexane, 1,6-di(2-methyl-4 - aminocyclohexyl) 1,1,2,2,3,3,4,4,5,5,6,6 - dodecamethylhexane and the like and mixtures of stereoisomers of said dialicyclicdiamines.

While any dialicyclic diamine having the general formula (I) and any mixture of stereoisomers of said dialicyclic diamine are operative in this invention, optimum results are obtained with dialicyclic diamines having the general formula (II) and stereoisomeric mixtures of said dialicyclic diamines.

Included among examples of dicarboxylic acids operative in the present invention are adipic, suberic, azelaic and sebacic.

Condensation of the dialicyclic diamine with the dicarboxylic acid may be effected by heating the salt of the diamine and dicarboxylic acid which has been previously prepared, as by admixing ethanol solutions of the diamine and the dicarboxylic acid. Alternatively, said condensation may be effected by heating a mixture of the diamine and the dicarboxylic acid. Ordinarily, said mixture contains equimolar proportions of said diamine and said carboxylic acid. Condensation of the reaction mixture is effected by heating regardless of whether the reaction mixture subjected to condensation is the salt of the diamine and dicarboxylic acid or is a mixture of said diamine and said dicarboxylic acid.

In general the condensation reaction is carried out by heating the polyamide forming ingredients in a closed vessel under an inert atmosphere, bleeding off the water so formed and continuing the heating at atmospheric pressure to further complete the reaction. An additional amount of heating under vacuum is sometimes desirable to obtain products of increased molecular weight. While the aforementioned heating may be effected at any temperature within the range of from 150° C. to 350° C., optimum results are obtained when said heating is carried out at a temperature within the range of from 200° C. to 330° C.

Broadly the novel products of this invention are linear polyamides having an intrinsic viscositiy of at least 0.4, obtained by condensing a dialicylic diamine of general formula (I) with a dicarboxylic acid having at least four carbon atoms between the carboxyl groups. Said polyamides have excellent resilience, as demonstrated by filament flexor values of not less than 80% and work recovery after stretching values at 0.76% elongation of not less than 85%, and are particularly useful for the production of molded articles and films and in the form of filaments, fibers, yarn and fabrics.

In a more restricted embodiment, the novel products of this invention are linear polyamides which have an intrinsic viscosity of not less than 0.4, which have high resilience as demonstrated by filament flexor values of not less than 80% and work recovery after stretching values at 0.76% elongation of not less than 85%, which are completely clear and transparent when in massive form, which are soluble in a mixture of equal volumes of chloroform and methanol, and which have relatively low softening points within the range of from 200° C. to 245° C. Polyamides coming within said particular subclass are obtained by condensing a dicarboxylic acid, having not less than four and not more than 12 carbon atoms between the carboxyl groups, with a stereoisomeric mixture of a dialicyclic diamine having the general formula (I), said mixture being liquid at 25° C. Said polyamides are particularly useful in the form of transparent molded articles and films, although of course they may also be used in the form of filaments, fibers, yarn and fabrics.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A fusible, clear, transparent linear polyamide which has an intrinsic viscosity of at least 0.4, is soluble in a mixture of equal parts by volume of chloroform and methanol, and which consists of the reaction product of substantially equimolecular proportions of a dicarboxylic acid, in which the carboxyl groups are separated by from 4 to 8 methylene groups, and a stereoisomeric mixture of di(p-aminocyclohexyl)methane which is liquid at 25° C.

2. A fusible, clear, transparent linear polyamide which has an intrinsic viscosity of at least 0.4, is soluble in a mixture of equal parts by volume of chloroform and methanol, and which consists of the reaction product of substantially equimolecular proportions of sebacic acid and a stereoisomeric mixture of di(p-aminocyclohexyl)methane which is liquid at 25° C.

3. A fusible, clear, transparent linear polyamide which has an intrinsic viscosity of at least 0.4, is soluble in a mixture of equal parts by volume of chloroform and methanol, and which consists of the reaction product of substantially equimolecular proportions of adipic acid and a stereoisomeric mixture of di(p-aminocyclohexyl) methane which is liquid at 25° C.

ELMER K. BOLTON.
WILLIAM KIRK, Jr.

REFERENCES CITED

The following references are of record in the file of this patent:

FOREIGN PATENTS

| Number | Country | Date |
| --- | --- | --- |
| 67,203 | Norway | Dec. 20, 1943 |

OTHER REFERENCES

Modern Plastics, Oct. 1945, pp. 152E and 152F.